(12) United States Patent
Dutka

(10) Patent No.: US 12,359,811 B2
(45) Date of Patent: Jul. 15, 2025

(54) TILE FOR A GAS TURBINE ENGINE COMBUSTOR

(71) Applicant: ROLLS-ROYCE PLC, London (GB)

(72) Inventor: Marcin Damian Dutka, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/804,670

(22) Filed: Aug. 14, 2024

(65) Prior Publication Data

US 2025/0067434 A1 Feb. 27, 2025

(30) Foreign Application Priority Data

Aug. 21, 2023 (GB) ...................................... 2312718

(51) Int. Cl.
*F23R 3/00* (2006.01)
*F02C 7/12* (2006.01)
*F23R 3/06* (2006.01)

(52) U.S. Cl.
CPC ................ *F23R 3/002* (2013.01); *F02C 7/12* (2013.01); *F23R 3/005* (2013.01); *F23R 3/06* (2013.01); *F23R 2900/00018* (2013.01); *F23R 2900/00019* (2013.01)

(58) Field of Classification Search
CPC ......... F23M 5/085; F23R 3/002; F23R 3/005; F23R 3/50; F23R 2900/00018; F23R 2900/00019; F23R 2900/03041; F23R 2900/03042; F23R 3/04; F23R 3/06
See application file for complete search history.

(56) References Cited

U.S. PATENT DOCUMENTS

| 4,480,436 | A | 11/1984 | Maclin | |
|---|---|---|---|---|
| 5,241,827 | A | 9/1993 | Lampes | |
| 9,631,813 | B2* | 4/2017 | Reinert | F23R 3/002 |
| 2006/0277921 | A1* | 12/2006 | Patel | F23R 3/06 |
| | | | | 60/752 |
| 2013/0251513 | A1* | 9/2013 | Stastny | B23K 1/0018 |
| | | | | 228/173.6 |
| 2014/0174092 | A1* | 6/2014 | Bogue | F01D 5/288 |
| | | | | 427/230 |
| 2014/0360196 | A1 | 12/2014 | Graves et al. | |
| 2015/0101335 | A1 | 4/2015 | Jayatunga | |
| 2015/0345789 | A1 | 12/2015 | Papple et al. | |

(Continued)

FOREIGN PATENT DOCUMENTS

| EP | 1 363 075 A2 | 11/2003 |
|---|---|---|
| EP | 3 255 344 A1 | 12/2017 |

(Continued)

OTHER PUBLICATIONS https://web.archive.org/web/20210117111730/https://lcdmcorp.com/grain-flow-101/how-to-repair-holes-in-metal/ , accessed May 15, 2025 (Year: 2021).*

(Continued)

*Primary Examiner* — Scott J Walthour
(74) *Attorney, Agent, or Firm* — Oliff PLC

(57) ABSTRACT

A tile for a gas turbine engine combustor. The tile has a base that has a hot-side surface, a cold-side surface, a first circumferential extremity, a second circumferential extremity and a local radial axis. The tile also has a plurality of cooling channels that have inlets on the cold-side surface and outlets on the hot-side surface, and one or more rail structure attached to the cold-side surface of the base.

17 Claims, 10 Drawing Sheets

(56) References Cited

U.S. PATENT DOCUMENTS

| | | | |
|---|---|---|---|
| 2015/0362191 A1 | 12/2015 | Papple et al. | |
| 2016/0069569 A1 | 3/2016 | Burd | |
| 2016/0265773 A1* | 9/2016 | Moura | F02C 7/18 |
| 2016/0298841 A1 | 10/2016 | Papple et al. | |
| 2017/0356653 A1 | 12/2017 | Bagchi et al. | |
| 2018/0266686 A1 | 9/2018 | Zelesky et al. | |
| 2020/0003423 A1 | 1/2020 | Porter et al. | |
| 2021/0372616 A1 | 12/2021 | Cheung | |

FOREIGN PATENT DOCUMENTS

| | | |
|---|---|---|
| EP | 3 315 863 A2 | 5/2018 |
| EP | 3 415 819 A1 | 12/2018 |
| EP | 3 460 332 A1 | 3/2019 |
| EP | 3366998 B1 | 5/2021 |
| WO | 2014/149108 A1 | 9/2014 |

OTHER PUBLICATIONS

Feb. 3, 2025 Communication issued in European Application No. 24189954.1.
Feb. 16, 2024 Search Report issued in British Patent Application No. 2312718.6.
Jul. 18, 2024 Search Report issued in British Patent Application No. 2312718.6.

* cited by examiner

TILE FOR A GAS TURBINE ENGINE COMBUSTOR

CROSS-REFERENCE TO RELATED APPLICATIONS

This specification is based upon and claims the benefit of priority from United Kingdom patent application number GB 2312718.6 filed on Aug. 21, 2023, the entire content of which is incorporated herein by reference.

BACKGROUND

Technical Field

The present disclosure relates to a tile for a gas turbine engine combustor.

Description of the Related Art

Combustor components operate at very high temperatures and their life is directly correlated to the local temperature profiles which they must endure. In the case of gas turbine engines, cooling methods are necessary to prevent excessive heat damage thereby prolonging the longevity of combustor components. Typically, cooling methods involve routing cooler air from the colder parts of the gas turbine engine into the combustor region to counter the negative effects of continuous operation at high temperatures.

However, routing air from the colder parts of the gas turbine engine negatively impacts the engine's efficiency and environmental performance. Gas turbine manufacturers continuously attempt to find a balance between achieving an economically viable amount of life for combustor components and attaining a suitable engine efficiency whilst meeting stringent emissions regulations. Therefore, the management of the cooling air budget for combustors represents a key area of focus with critical implications for the holistic performance of gas turbine engines.

SUMMARY

In a first aspect, there is provided a tile for a gas turbine engine combustor, the tile comprising: a base comprising a hot-side surface, a cold-side surface, a first circumferential extremity, a second circumferential extremity and a local radial axis; a plurality of cooling channels having inlets on the cold-side surface and outlets on the hot-side surface; and one or more rail structures attached to the cold-side surface of the base, wherein the or each rail structure comprises one or more cambered sections arranged at an angle relative to the local radial axis.

In some embodiments, the or each rail structure comprises two edge sections located around the circumferential extremities.

In some embodiments, at least one of the edge sections comprises at least one perforation.

In some embodiments, at least one of the edge sections is a cambered section arranged at an angle relative to the local radial axis.

In some embodiments, the or each rail structure further comprises at least one circumferential section.

In some embodiments, at least one cambered section extends into the at least one circumferential section.

In some embodiments, the angle relative to the local radial axis ranges between +80 degrees and −80 degrees.

In some embodiments, the base further comprises at least one of a locating feature and a retaining feature embedded around at least one of the circumferential extremities.

In some embodiments, at least one stud for attaching the tile to an external component is attached to the cold-side surface.

In a second aspect, there is provided a combustor for a gas turbine engine, the combustor comprising: a liner divided into a plurality of sectors and comprising an inner porous wall and an outer porous wall which extend circumferentially across the sectors, wherein the walls are connected via an inlet structure; a plurality of fuel injectors distributed circumferentially across the sectors of the liner and retained by the inlet structure; and at least one tile as previously recited.

In some embodiments, the or each rail structure is configured to seal a cavity between the cold-side surface and the liner wall to which the at least one tile is attached.

In some embodiments, the at least one tile is attached to the liner walls via at least one stud.

In some embodiments, the combustor comprising at least two tiles as previously recited, wherein the tiles are connected to each other through pairs of locating features and retaining features, and wherein the locating features and retaining features are embedded in the bases.

In a third aspect, there is provided a gas turbine engine comprising a combustor as previously recited.

In a fourth aspect, there is provided a method of manufacturing a combustor for a gas turbine engine, the method comprising: providing a liner comprising an inner porous wall and an outer porous wall; connecting the inner wall and the outer wall via an inlet structure; mounting and retaining a plurality of fuel injectors in the inlet structure; and attaching at least one tile as previously recited to the liner walls.

In a fifth aspect, there is a method of improving the cooling performance of a combustor for a gas turbine engine, the method comprising: providing a combustor comprising a liner having an inner porous wall and an outer porous wall and a plurality of porous tiles attached to the liner walls, wherein each tile comprises a base having a hot-side surface, a cold-side surface and a local radial axis; operating the combustor to generate combustion products, wherein the tiles are exposed to the combustion products; classifying regions of the tiles in accordance with their exposure to the combustion products, wherein regions with a higher level of exposure are classified as hot regions and regions with a lower level of exposure are classified as cool regions; delimiting the classified regions on the cold-side surfaces of the tiles by attaching rail structures to the cold-side surfaces and forming delimited hot regions and delimited cool regions, wherein each delimited region has a corresponding porosity; altering the porosities of the delimited regions and the porosities of the corresponding liner walls in accordance with the classifications of the delimited regions; and installing the altered tiles and liner walls in the combustor.

In some embodiments, a porosity ratio of the porosities of the delimited hot regions relative to the porosities of the corresponding liner walls is adjusted such that the pressure drop over the delimited hot regions is at least 10% of the combustor inlet pressure.

In some embodiments, the porosity ratio of the porosities of the delimited hot regions relative to the porosities of the corresponding liner walls is reduced by increasing the porosity of the liner walls and/or by reducing the porosity of the delimited hot regions.

In some embodiments, a porosity ratio of the porosities of the delimited cool regions relative to the porosities of the corresponding liner walls is increased by reducing the porosities of the liner walls or by reducing the porosities of the liner walls and increasing the porosities of the delimited cool regions.

In some embodiments, each porous tile has a number of cooling channels, wherein each cooling channel has a cross-section, and wherein an increase in the porosity of a delimited region is realised by an increase in the number of cooling channels and/or an increase in the cross-sections of the cooling channels in the delimited region and correspondingly, a decrease in the porosity of a delimited region is realised by a decrease in the number of cooling channels and/or a decrease in the cross-sections of the cooling channels in the delimited region.

BRIEF DESCRIPTION OF THE DRAWINGS

Embodiments will now be described by way of example only, with reference to the accompanying drawings, which are purely schematic and not to scale, and in which.

DETAILED DESCRIPTION

Figure 1:
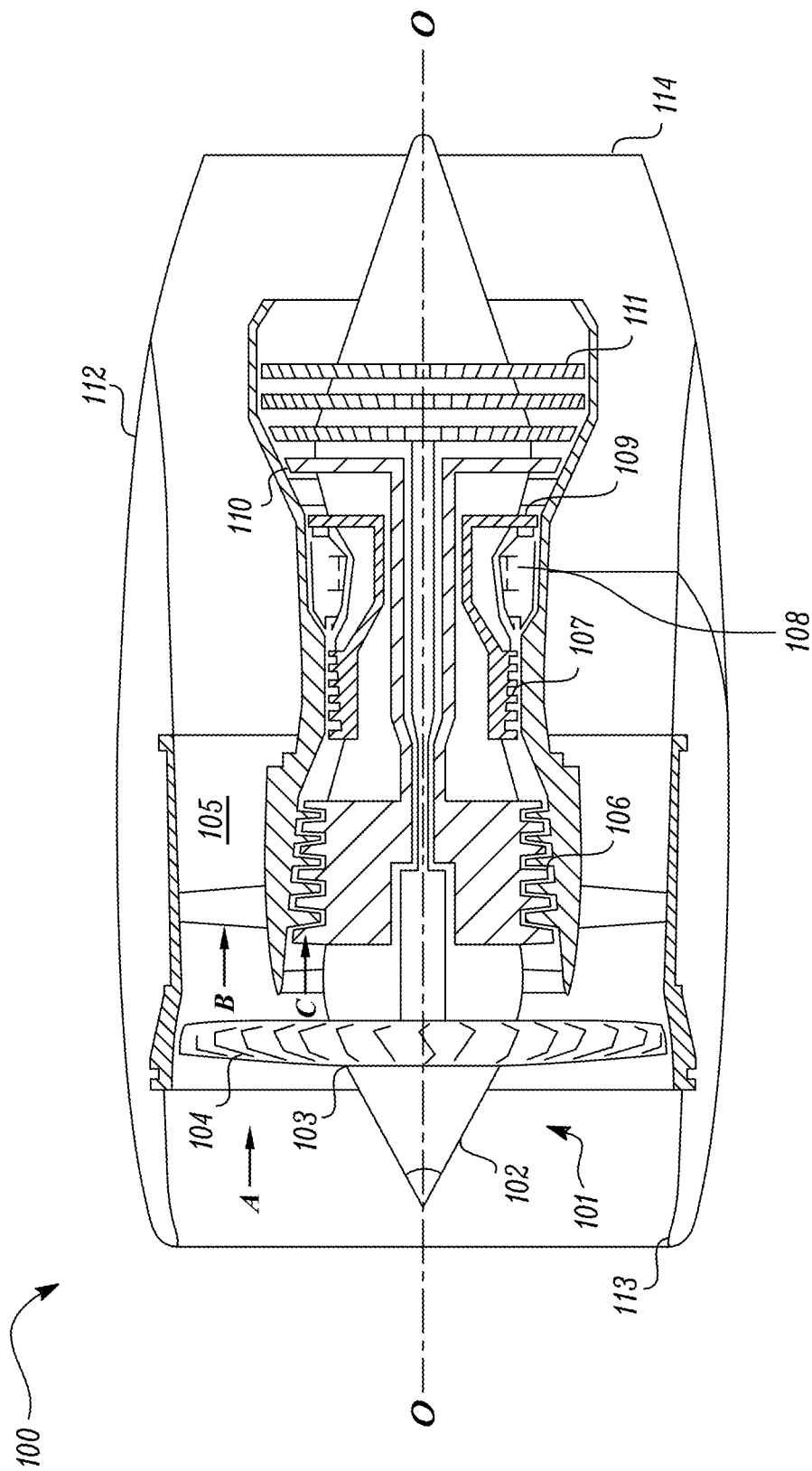
FIG. 1 shows a gas turbine engine that includes a combustor.

A general arrangement of a gas turbine engine is shown in FIG. 1. In this embodiment, the engine is a gas turbine engine 100 with a principal rotational axis O-O. The engine 100 comprises a fan assembly 101, a bypass duct 105 and a core gas turbine. The core gas turbine comprises, in fluid flow series, an intermediate-pressure compressor 106, a high-pressure compressor 107, a combustor 108, a high-pressure turbine 109, an intermediate-pressure turbine 110, a low-pressure turbine 111. A nacelle 112 generally surrounds the engine 100 and defines both an intake 113 and an exhaust nozzle 114.

The fan assembly 101 comprises a plurality of fan blades 104 mounted upon a hub 103, and a nosecone 102 connected with the hub 103 and configured to rotate therewith. Those skilled in the art will be familiar with the various possible arrangements for mounting fan blades and nosecones to fan hubs, along with any other aerodynamic fairings required to seal the inner gas-washed surface of the fan stage.

In operation, the fan assembly 101 receives intake air A, rotates and generates two pressurised airflows: a bypass flow B which passes axially through the bypass duct 105, and a core flow C which enters the core gas turbine. The core flow C is compressed by the intermediate-pressure compressor 106 and is then directed into the high-pressure compressor 108 where further compression takes place. The compressed air exhausted from the high-pressure compressor 107 is directed into the combustor 108 where it is mixed with fuel and the mixture is combusted. The resultant hot combustion products then expand through, and thereby drive, the high-pressure turbine 109, the intermediate-pressure turbine 110, and the low-pressure turbine 111, before being exhausted via the exhaust nozzle 114 to provide a proportion of the overall thrust.

The high-pressure turbine 109 drives the high-pressure compressor 107 via an interconnecting shaft. The intermediate-pressure turbine 110 drives the intermediate-pressure compressor 106 via another interconnecting shaft. The low-pressure turbine 111 drives the fan assembly 101 via yet another interconnecting shaft. The three interconnecting shafts are arranged concentrically around O-O. Those skilled in the art will recognise the engine 100 as having a direct-drive, three-shaft architecture.

It will be appreciated that in other embodiments, the engine 100 could alternatively be configured as a direct-drive, two-shaft architecture in which the intermediate-pressure spool is omitted. In one such configuration, both the intermediate-pressure compressor 106 and the intermediate-pressure turbine 110 may be omitted. In 20 operation, the fan blades 104 would provide an initial stage of compression, with the remainder of the overall pressure ratio of the engine 100 being delivered by the high-pressure compressor 107. Another direct-drive, two-shaft architecture may be implemented by providing a booster compressor between the fan assembly 101 and the high-pressure compressor 107, the booster compressor being driven by the low-pressure turbine 111.

In other embodiments, the engine 100 may be configured with a geared architecture, in which the low-pressure turbine 111 drives the fan assembly 101 via a reduction gearbox. The reduction gearbox may be an epicyclic gearbox of star, planetary or compound configuration. Alternatively, the reduction gearbox may be of any other suitable configuration, such as a layshaft.

It will be appreciated that in other embodiments, the engine 100 could be configured such that the fan assembly 101 generates a single pressurised airflow which is routed entirely into the core gas turbine. In this configuration, the bypass duct 105 may be omitted and the core gas turbine provides the entirety of the engine 100 thrust.

In other embodiments, the engine 100 could be configured without a nacelle 115 in order to be employed as a ductless fan aero engine or open fan aero engine, a marine gas turbine engine or land-based gas turbine engine.

Figure 2A:
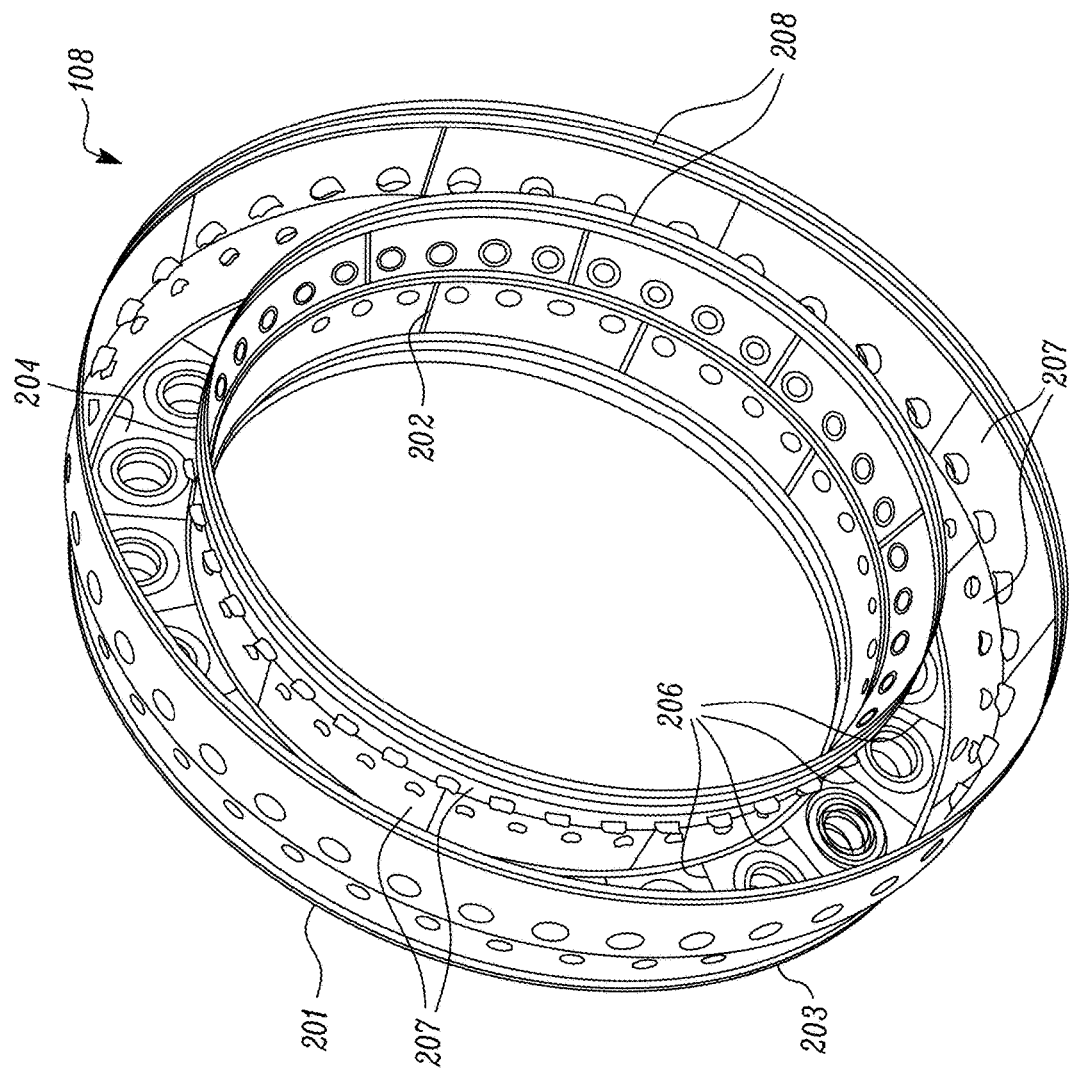
FIG. 2A is a perspective view of the combustor of FIG. 1.
Figure 2B:
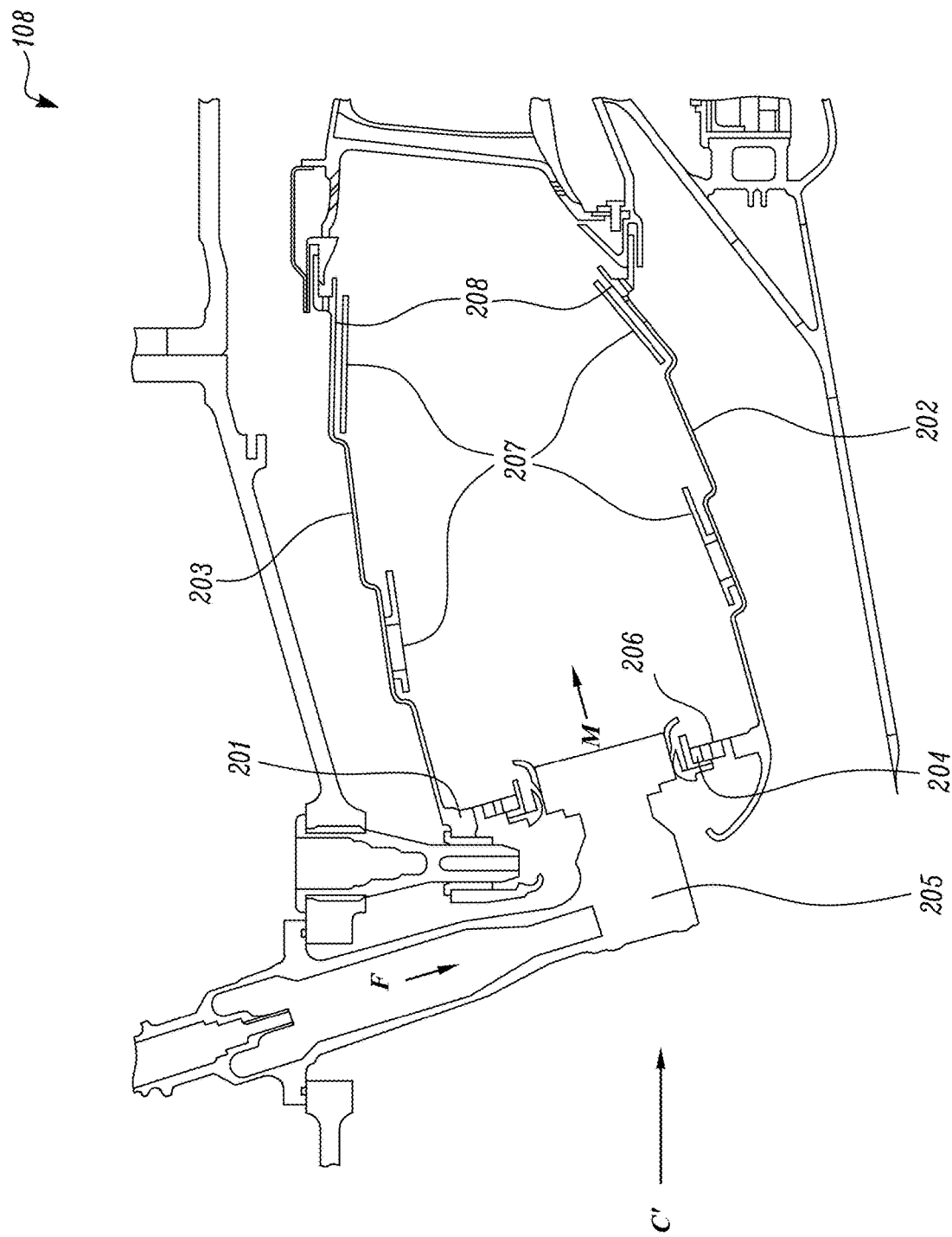
FIG. 2B is a sectional view of the combustor that has a combustor liner.

Referring again to the drawings, the combustor 108 is shown in perspective view in FIG. 2A and in sectional view in FIG. 2B. The combustor 108 comprises a liner 201, a plurality of fuel injectors 205 and a plurality of tiles 207. The liner 201 is divided into a plurality of sectors 206 and comprises an inner porous wall 202 and an outer porous wall 203 which extend circumferentially across the liner sectors 206. The fuel injectors 205 and tiles 207 are distributed circumferentially across the liner sectors 206. The liner 201 further comprises an inlet structure 204 which connects the inner wall 202 and outer wall 203 and retains the fuel injectors 205. Depending on its location, a tile 207 is attached to either the inner wall 202 or the outer wall 203 of the liner 201. This attachment forms a cavity 208 which is represented by the volume delimited by the tile 207 and the liner wall to which it is attached.

In operation, the combustor 108 is configured to receive the compressed air C' exhausted from the high-pressure compressor 107, mix a proportion of this airflow C' with a supply of fuel F and ignite the resulting mixture M to form combustion products. A proportion of airflow C' involved in the combustion process enters the liner 201 via the inlet structure 204. The supply of fuel F enters the liner 201 via the fuel injectors 205. The motion of the resulting fuel-air mixture M is a function of the fuel injector nozzle geometry and has a swirl component which leads to a non-uniform distribution of combustion products across the walls of the liner 201. Therefore, the tiles 207 mounted on the liner walls are impacted in a non-uniform manner in accordance with their sectorial and axial combustor locations and the corresponding exposure to the combustion products. The remaining airflow which does not enter the inlet structure 204 is routed across the combustor for functional purposes such as cooling, combustion process enhancement or emissions mitigation. This fluid motion is realised via the pressure differential characterising the combustor 108 as a whole.

It will be appreciated that the combustor 108 operates at a pressure drop between the combustor outlet pressure and combustor inlet pressure which ranges between 1% to 8%. However, in this specific embodiment, the pressure drop ranges between 2% to 5%.

It will be appreciated that the combustor 108 comprises a number of sectors 406 which ranges between 10 to 30. However, in this specific embodiment, the combustor 108 comprises 20 sectors 406.

Figure 3:
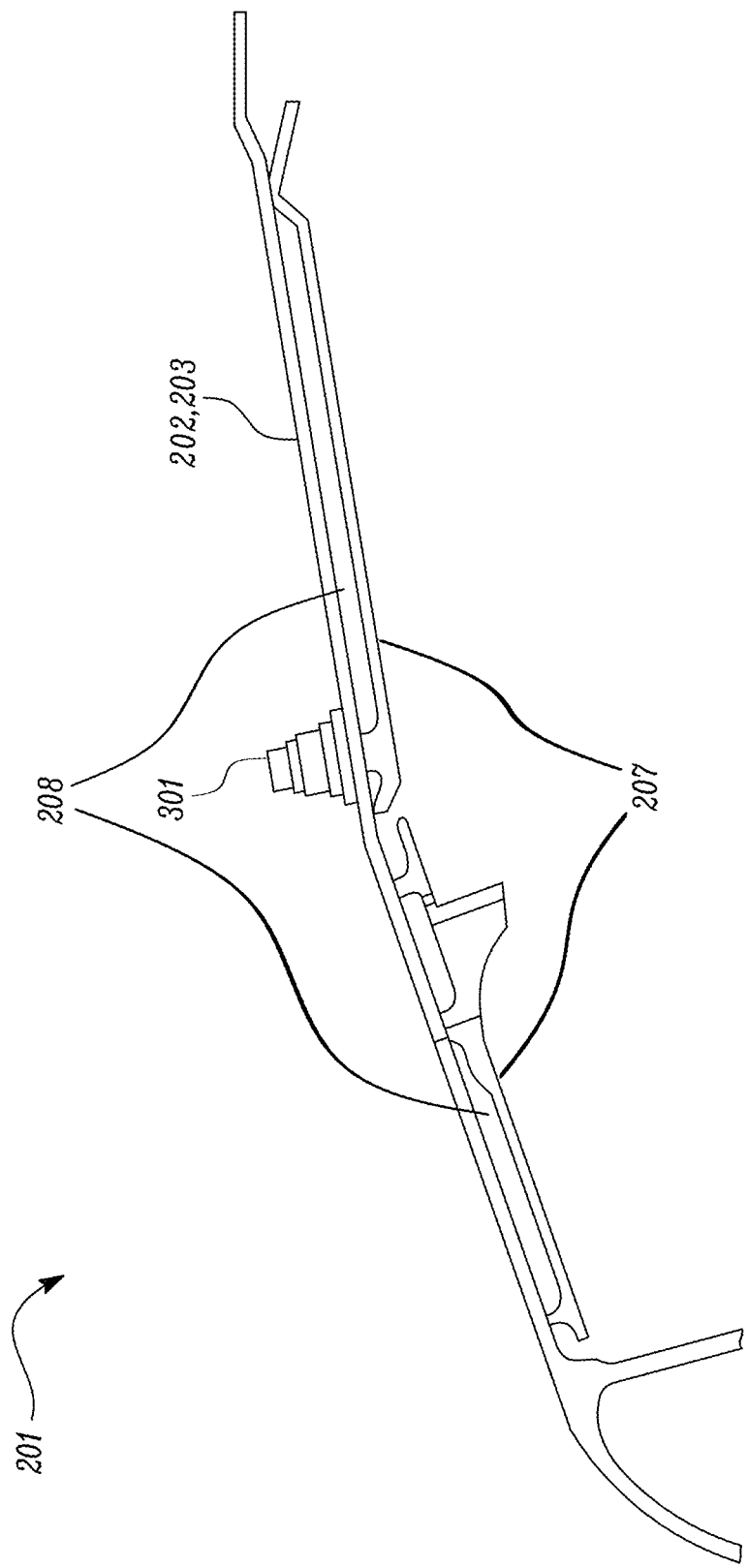
FIG. 3 is a sectional view of a tile attached to a wall of the combustor liner.

FIG. 3 illustrates the attachment of a tile 207 to a liner wall. The attachment is realised in the same manner regardless of whether the liner wall is an inner wall 202 or an outer wall 203. In this specific embodiment, the attachment is realised through the means of a stud 301. However, it will be appreciated that a tile 207 may be attached to a liner wall via a plurality of studs 301. Similarly, it will also be appreciated that the tile 207 may be attached to liner walls without using any studs 301. Such configurations may rely instead on inter-tile connections with tiles 207 which do have studs 301. The studs 301 are attached to the surfaces of the tiles 207 and extend outwards such that they can be further attached to an external component. In this specific embodiment, the stud 301 extends through a liner wall and is fastened to ensure the retainment of the tile 207 to the liner wall. Once attached, the tile 207 and the liner wall form a cavity 208. It will be appreciated that the cavity 208 between the tile 207 and the liner wall is formed regardless of the tile-liner attachment method.

Figure 4:
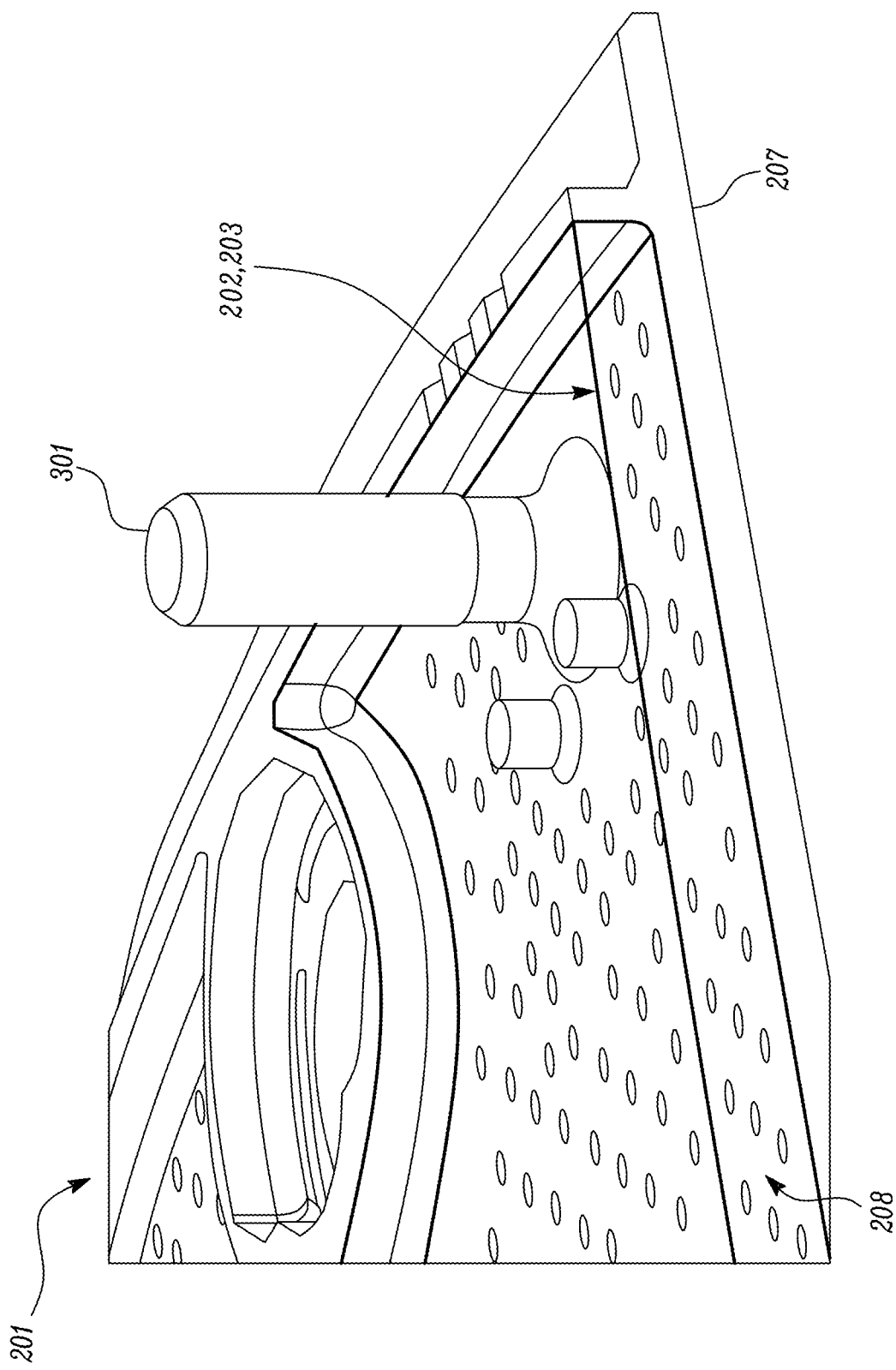
FIG. 4 is a perspective view of the part of the tile that shows a cavity formed between the tile and the combustor liner.

FIG. 4 illustrates the cavity 208 delimited by the tile 207 and the liner wall to which the tile 207 is attached. In operation, a proportion of the airflow allocated for cooling enters the cavity 208 due to the porosity of the components delimiting the cavity 208 and interacts with the surfaces of these components. The distribution of cooling air within the cavity 208 serves to alter the temperature profiles in specific areas of the tile 207 such that its thermal performance and longevity are enhanced.

Figure 5A:
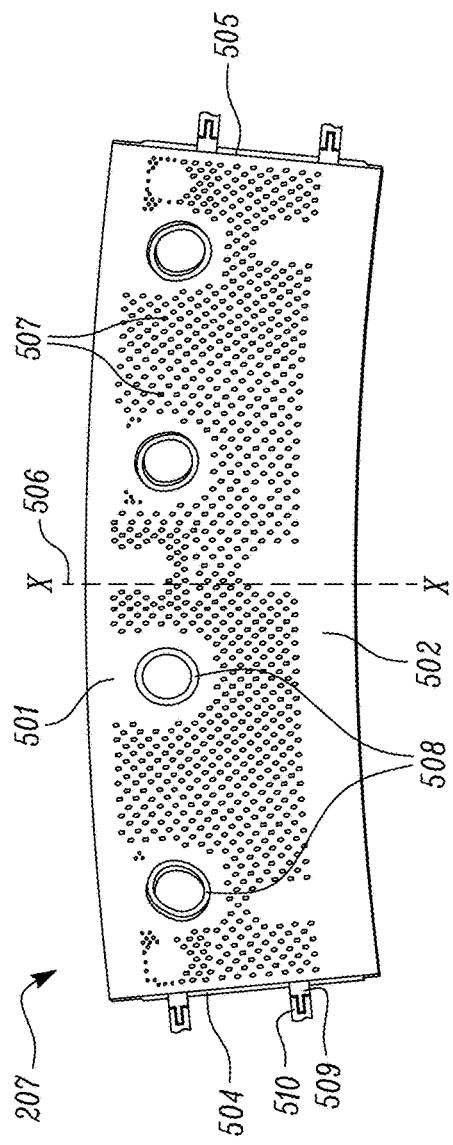
FIG. 5A is a view of the hot-side surface of the tile of FIG. 3.

FIG. 5A shows the tile 207 from the hot-side perspective. The tile 207 comprises a base 501 and a plurality of cooling channels 507. The base 501 comprises a hot-side surface 502, a cold-side surface 503, a first circumferential extremity 504, a second circumferential extremity 505 and a local radial axis 506. The cooling channels 507 have inlets on the cold-side surface 503 and outlets on the hot-side surface 502, thereby traversing the base 501 across its entire thickness. It will be appreciated by those skilled in the art that cooling channels are also referred to as cooling holes. The local radial axis 506 associated with a particular location on the base 501 is taken to mean the instantaneous radial axis derived from the curvature of the base 501 at that particular location. Accordingly, depending on the overall curvature of the base 501, different locations on the base 501 may be associated with different local radial axes 506. In such a case, each location on the base 501 has a corresponding radial axis 506.

In this specific embodiment, the cooling channels 507 have curved-shaped cross-sections which remain constant as they traverse the base 501. However, it will be appreciated that the cross-sectional profile of the cooling channels 507 may be polygonal or a combination of curved and linear elements. Moreover, it will also be appreciated that the cross-sectional profile of the cooling channels 507 may exhibit an amount of tapering between the cold-side cooling channel inlet and the hot-side cooling channel outlet. Furthermore, it will be appreciated that the centrelines of the cooling channels 507 are orientated at angles ranging between −80 degrees to +80 degrees relative to an axis perpendicular to the base 501. In this specific embodiment, the cooling channel centreline angles vary between −45 degrees to +45 degrees. In this specific embodiment, the distribution of cooling channels 507 corresponds to a tile 207 mounted on the outer wall 203 of the combustor liner 201. However, it will be appreciated that various other cooling channel distribution arrangements are possible as required by the functional requirements of the tile 207. For a gas turbine engine combustor 108, the functional requirements of the tiles 207 are derived from the sectoral and axial locations of the tiles 207 within the combustor 108, the lifecycle requirements of the tiles 207 and liner 201 and the porosity requirements of the combustor 108.

In this specific embodiment, the tile 207 further comprises four mixing ports 508 configured to enhance the combustion process by transferring a proportion of the airflow C' into the combustion zone. Each mixing port 508 has an inlet on the cold-side surface 503 of the base 501 and an outlet on the hot-side surface 502 of the base 501. However, it will be appreciated that the tile 207 may contain no mixing ports 208, a single mixing port 208 or a plurality of mixing ports 208.

In this specific embodiment, the base 501 of the tile 207 further comprises pairs of locating features 509 and retaining features 510 configured to enable inter-tile connections between adjacent tiles 207. The pairs are embedded around the circumferential extremities of the base 501 and extend outwards in the circumferential direction. However, it will be appreciated that other embedment configurations may be possible. By way of example, the retaining feature 510 can be formed as a slot or as a groove on the cold-side surface 503 around a circumferential extremity of the base 501. Correspondingly, the locating feature 509 may be a pin or a rod attached to the cold-side surface 503 around a circumferential extremity of the base 501. When located next to an adjacent tile 207 with a slot or grove style retaining feature 510, the pin or rod style locating feature 509 is configured to slide into the retaining feature 510 and thereby connecting two adjacent tiles 207.

Furthermore, it will also be appreciated that the base 501 may embed these pairs around only one of its circumferential extremities. Similarly, it will also be appreciated that these pairs may be completely omitted from the base 501 and the tile 207 as a whole. Moreover, the distribution and configuration of the pairs is shown by example only. Those skilled in the art will be familiar with various other possible arrangements for creating a joint connection between two components via a male-female system.

Figure 5B:
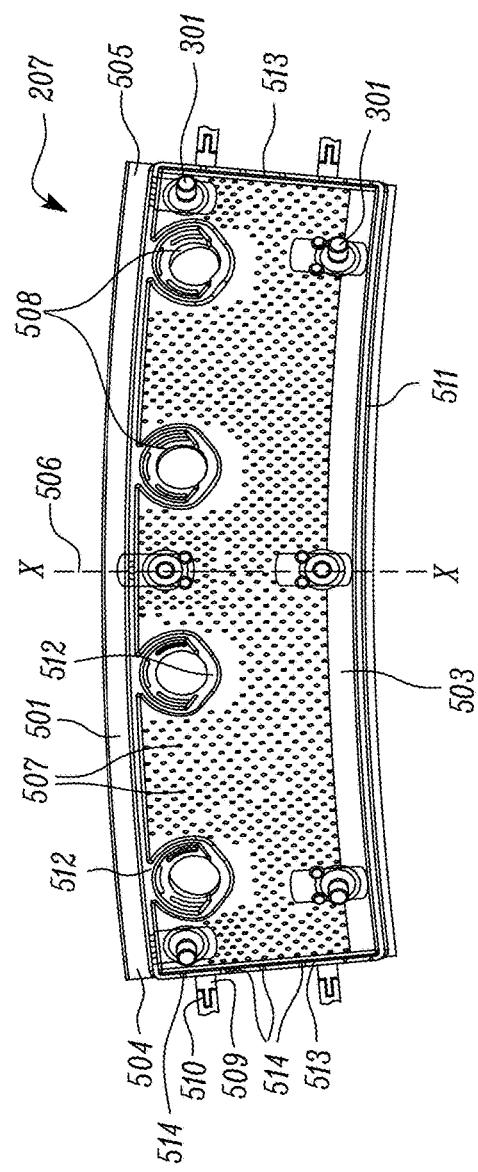
FIG. 5B is a view of the cold-side surface of the tile of FIG. 3.

As described previously, the tile 207 comprises one or more rail structures attached to the cold-side surface 503 of the base 501. Referring to FIG. 5B, the tile 207 is shown from the cold-side perspective. In this specific embodiment, the tile 207 comprises one rail structure 511. However, it will be appreciated that the tile 207 may comprise a plurality of rail structures 511, wherein each rail structure 511 may be connected to or separated from other rail structures 511. The rail structure 511 delimits a perimeter alongside the edges of the base 501 and thereby forms an internal zone on the cold-side surface 503. In this specific embodiment, four mixing port inlets 508 are also present on the cold-side surface 503 and each of them is delimited by a circumferential section 512 contained within the rail structure 511. However, it will be appreciated that if a different number of mixing ports 508 is present, then a corresponding number of associated circumferential sections 512 will be contained within the rail structure 511.

In this specific embodiment, the rail structure 511 is continuous. However, it will be appreciated that the rail structure 511 can be split continuously or non-continuously into a plurality of sections to accommodate the installation of the tile 207 onto an external component such as the liner 201 of a combustor 108 for a gas turbine engine 100. Additionally, it will also be appreciated that the rail structure 511 may contain at least one gap configured to enable the tile 207 to achieve specific pressure drop distributions.

The perimeter delimited by the rail structure 511 comprises two edge sections 513 located around the circumferential extremities of the base 501. In this specific embodiment, both edge sections 513 comprise a plurality of perforations 514 configured to purge the tile-liner cavity 208 when the combustor 108 is in operation. However, it will be appreciated that only one or none of the edge sections 513 may contain perforations 514. It will also be appreciated that either of the edge sections 513 may contain only a single perforation 514.

In operation, the rail structure 511 is configured to seal the cavity 208 represented by the volume formed between the cold-side surface 503 of the tile 207 and the wall of the liner 201 to which the tile 207 is attached. This allows for a local pressure drop profile to be configured across the internal zone defined by the rail structure 511. The local pressure drop profile is selected as to enable the cooling air entering the cavity 208 to form an effective cooling film along the hot-side surface 502 of the tile 207.

Figure 6:
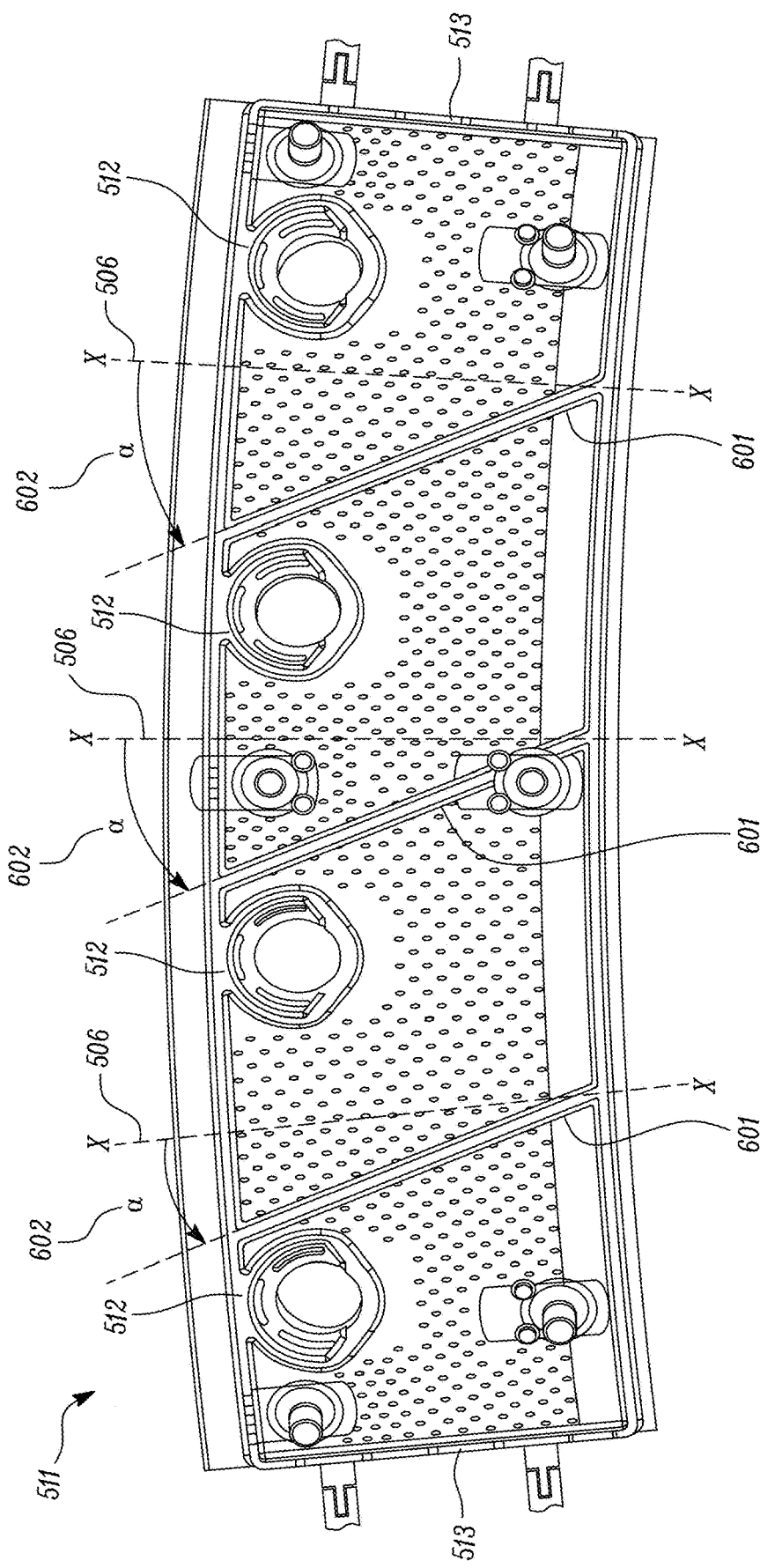
FIG. 6 shows a rail structure configuration on the cold-side surface of the tile.

FIG. 6 shows an example of the rail structure 511 on the cold-side surface 503 of FIG. 5B. In this specific embodiment, three angled cambered sections 601 and four circumferential sections 512 are presented as being contained within the rail structure 511. Each cambered section 601 is arranged at an angle 602, a, relative to the local radial axis 506 of the base 501. The angles 602 are selected such that the cambered sections 601 are parallel with each other. However, it will be appreciated that each cambered section 601 may be arranged independently of other cambered sections 601 at angles 602 which range between +80 degrees and −80 degrees. Moreover, it will also be appreciated that this configuration may involve only one cambered section 601 or a plurality of cambered sections 601 and any number of circumferential sections 512. Additionally, it will be further appreciated that at least one of the edge sections 513 of the rail structure 511 can be an angled cambered section 601.

In operation, the cambered sections 601 serve to divide the internal zone defined by the rail structure 511 into further zones, each zone having a different local pressure drop profile. This enables a high degree of customisation for each individual zone in order to enhance the management of the cooling air budget and improve the film cooling effectiveness.

Figure 7:
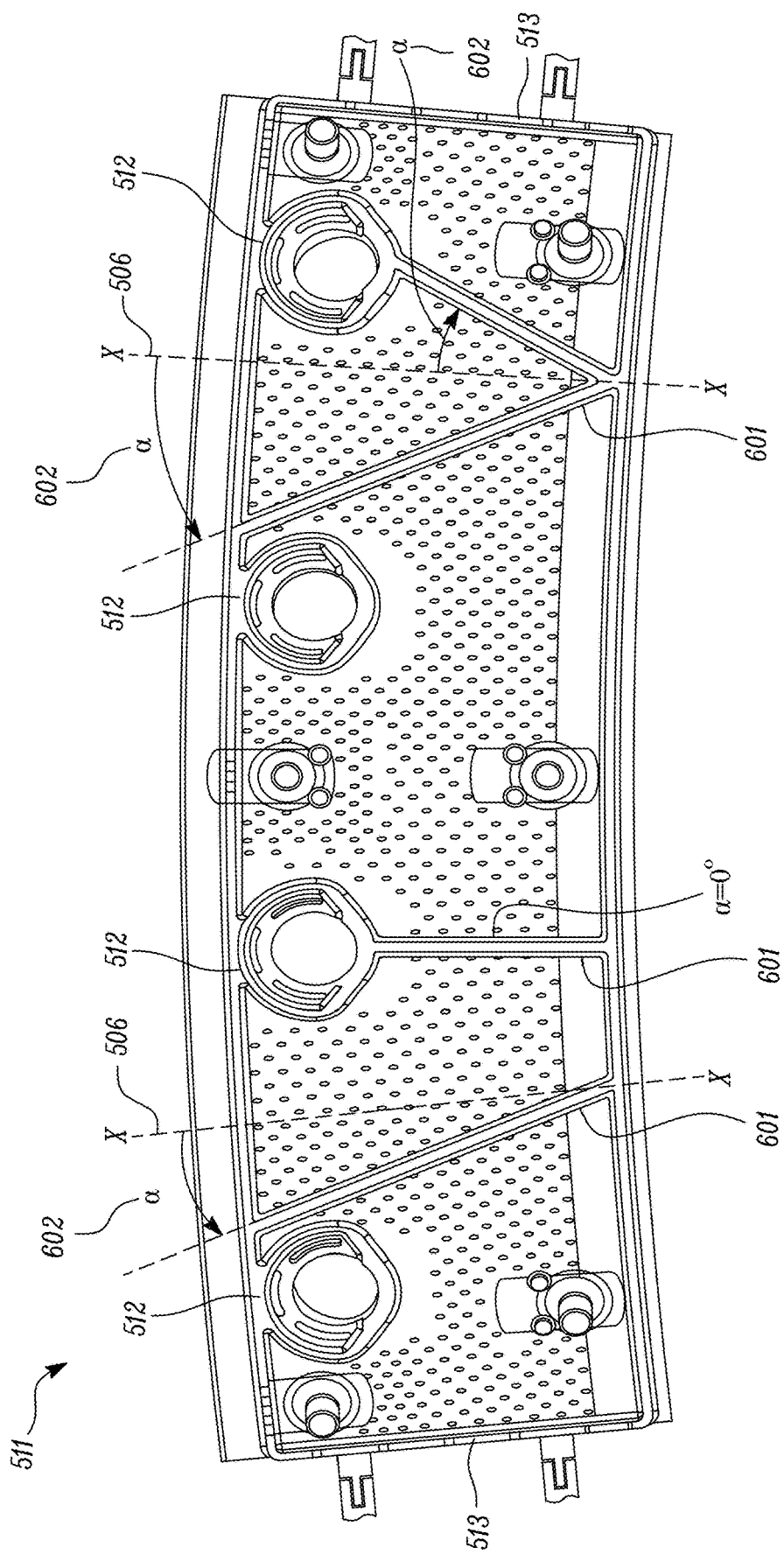
FIG. 7 shows a further rail structure configuration on the cold-side surface of the tile.

FIG. 7 illustrates a further example of the rail structure 511 on the cold-side surface 503 of FIG. 5B. In this specific embodiment, the rail structure 511 comprises four angled cambered sections 601 and four circumferential 512 sections. However, it will be appreciated that this configuration may involve one circumferential section 512 or a plurality of circumferential sections 512 and one cambered section 601 or a plurality of cambered sections 601. Each cambered section 601 may be arranged in relation to or independently of other cambered sections 601 at angles 602 which range between +80 degrees and −80 degrees. Moreover, it will also be appreciated that a cambered section 601 may be extending directly into a circumferential section 512 and vice versa. Similarly, it will also be appreciated that a cambered section 601 may be merely connected to a circumferential section 512 and vice versa only via the overall rail structure 511. Additionally, it will be further appreciated that at least one of the edge sections 513 of the rail structure 511 can be an angled cambered section 601.

In operation, the cambered sections 601 and circumferential sections 512 serve to divide the internal zone defined by the rail structure 511 into further zones, each zone having a different local pressure drop profile. This provides further customisation options for each individual zone in order to enhance the management of the cooling air budget and improve the film cooling effectiveness.

Figure 8:
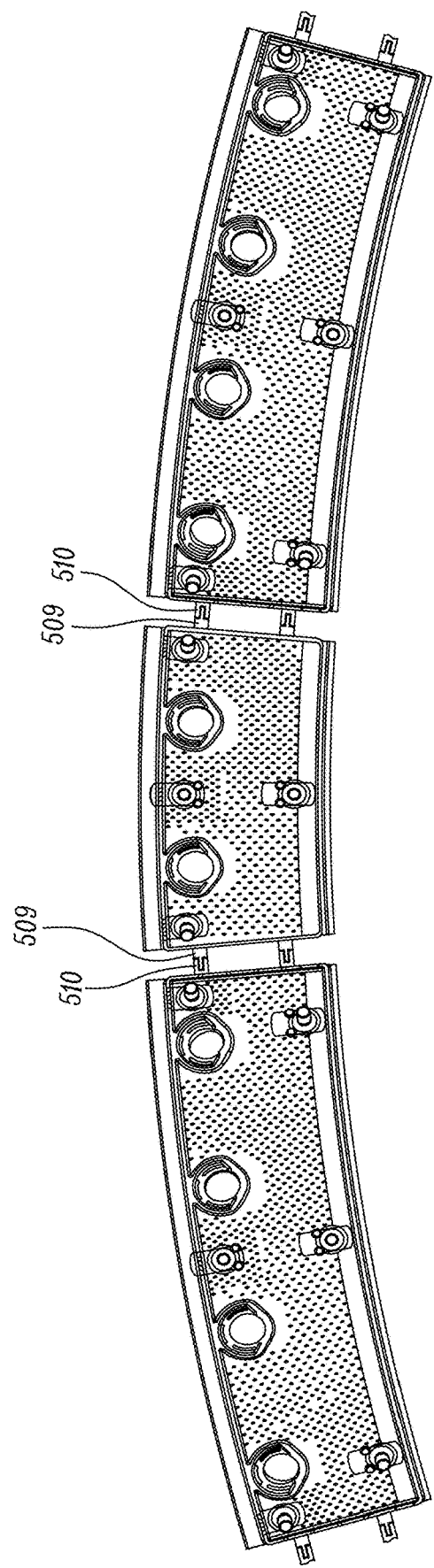
FIG. 8 is a view of the inter-tile attachment system.

Referring to FIG. 8, three adjacent tiles 207 are shown connected to each other via pairs of locating features 509 and retaining features 510. In this specific embodiment, three tiles 207 of varying circumferential dimensions and configurations are inter-connected. However, it will be appreciated that the inter-tile connection system is applicable to any number of tiles 207 of any circumferential dimension and any configuration. Moreover, it will also be appreciated that any number of locating-retaining pairs may be involved in the inter-tile connection system. Additionally, it will be further appreciated that not all tiles 207 may have such pairs. Some tiles 207 may be directly installed onto the relevant external component, i.e. the liner wall of a combustor 108 for a gas turbine engine 100, wherein such tiles 207 which are adjacent to each other do not comprise locating-retaining pairs between their adjacent interfaces. Other tiles 207 may not be installed onto an external component and can instead be inserted alongside those installed tiles 207 via locating-retaining pairs between relevant adjacent interfaces.

Figure 9A:
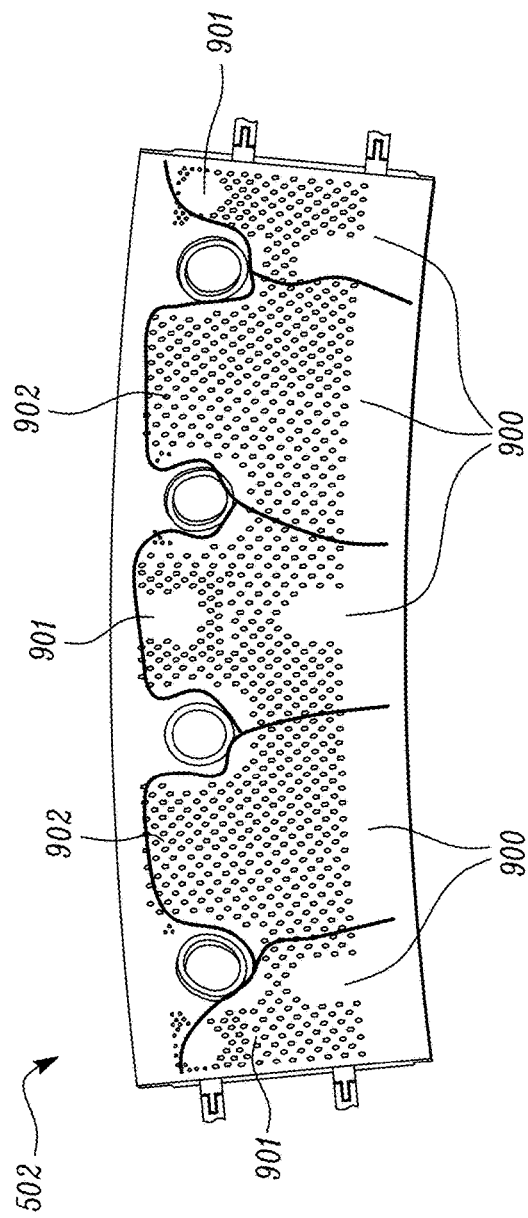
FIG. 9A is a view of the hot and cool regions forming on the hot-side surface of a tile.

FIG. 9A shows the regions 900 forming on the hot-side surface 502 of FIG. 5A during the operation of a tile 207 in a combustor 108 for a gas turbine 100. In operation, the hot-side surface 502 of a tile 207 is exposed to the combustion products. However, due to the swirl component present in the combustion products' motion across the combustor 108, different regions 900 of the tile 207 experience different levels of exposure to the combustion products. Therefore, regions 900 with a higher degree of exposure to the combustion products are classified as hot regions 901 while regions 900 with a lower degree of exposure to the combustion products are classified as cool regions 902. This classification may be conducted operationally, experimentally, computationally or analytically. For example, numerical simulations using computational fluid dynamics (CFD) methods can be conducted to determine the hot 901 and cool 902 profiles of the regions 900. Alternatively, thermal paint can be applied to the hot-side surfaces 502 of the tiles 207 such that the classification of the regions 900 is determined during combustor rig testing or full gas turbine engine testing. In this specific embodiment, the distribution of hot regions 901 and cool regions 902 is by way of example only. It will be appreciated that the exact distribution of hot 901 and cool 902 regions varies from tile 207 to tile 207 in accordance with the tile's sectorial and axial combustor location and the corresponding exposure to the combustion products.

Figure 9B:
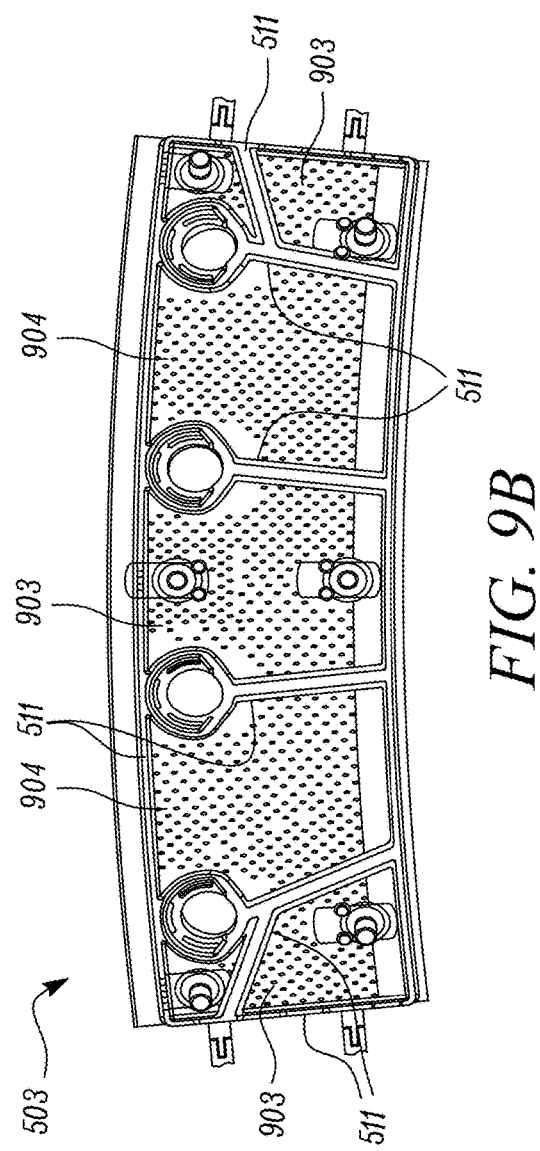
FIG. 9B is a view of the hot and cool regions on the cold-side surface of a tile corresponding to the hot and cool regions of FIG. 9A.

FIG. 9B shows the hot regions 903 and cool regions 904 on the cold-side surface 503 corresponding to the hot regions 901 and cool regions 902 of FIG. 9A. The cold-side surface hot 903 and cool 904 regions are delimited via the rail structure 511 of the tile 207. In this specific embodiment, the arrangement of the rail structure 511 is by way of example only. It will be appreciated that any configuration involving at least one of a circumferential section 512 and an angled cambered segment 601 can be employed to delimit the cold-side surface hot 903 and cool 904 regions.

In operation, the delimited cold-side surface hot 903 and cool 904 regions serve to divide the internal zone defined by the rail structure 511 into further zones, each zone having a different local pressure drop profile. This allows for specific cooling configurations to be implemented in accordance with the hot or cool classification of the delimited region. Such specific cooling configurations are achieved by altering the porosities of the delimited cold-side surface hot 903 and cool 904 regions and the porosities of the corresponding liner wall to which the tile 207 is attached. In turn, the implemented configurations serve to enhance the management of the cooling air budget and improve the film cooling effectiveness.

An increase in the porosity of a delimited region is realised by an increase in the number of cooling channels 507 or an increase in the diameter of the existing cooling channels 507 in the delimited region. Alternatively, an increase in the porosity of a delimited region is realised by an increase in the number of cooling channels 507 and an increase in the diameter of the existing cooling channels 507 in the delimited region. Correspondingly, a decrease in the porosity of a delimited region is realised by a decrease in the number of cooling channels 507 or a decrease in the diameter of the existing cooling channels 507 in the delimited region. Alternatively, a decrease in the porosity of a delimited region is realised by a decrease in the number of cooling channels 507 and a decrease in the diameter of the existing cooling channels 507 in the delimited region.

In an embodiment, the porosity ratio of the delimited cold-side surface hot regions 903 relative to the corresponding liner walls which the tile 207 is attached to is adjusted such that the pressure drop over the delimited hot regions 903 does not fall below a critical percentage value higher or equal to 10% of the combustor inlet pressure. This porosity ratio may be reduced by increasing the porosity of the corresponding liner walls or by reducing the porosity of the delimited hot regions 903. Alternatively, the porosity ratio may be reduced by increasing the porosity of the corresponding liner walls and by reducing the porosity of the delimited hot regions 903.

In an embodiment, the porosity ratio of the delimited cold-side surface cool regions 904 relative to the corresponding liner walls which the tile 207 is attached to is increased either by reducing the porosity of the liner walls or by reducing the porosity of the liner walls and increasing the porosity of the delimited cool regions 904. However, it will be appreciated that this porosity ratio is adjusted such that the pressure drop over the delimited cool regions 904 falls to zero for configurations in which cooling channels 507 having cross-sectional profiles at the manufacturing upper tolerance limit are matched with liner wall porosities having cross-sectional profiles at the manufacturing lower tolerance limit.

In an embodiment, the porosity of the liner walls corresponding to a delimited cold-side surface cool region 904 is equal or lower than the porosity of the liner walls corresponding to a delimited cold-side surface hot region 903.

In an embodiment, the effective flow area of the cooling channels 507 in the delimited cold-side surface cool regions 904 is equal or greater than the effective flow area of the cooling channels 507 in the delimited cold-side hot regions 903. The effective flow area of the cooling channels 507 is determined by the number of cooling channels 507 and their associated cross-sectional profiles. In this specific embodiment, the number of cooling channels 507 in the delimited cold-side surface cool regions 904 is equal or greater than the number of cooling channels 507 in the delimited cold-side hot regions 903. However, those skilled in the art will appreciate that configuring the effective flow area of the cooling channels 507 may involve either changing the number of cooling channels 507 or modifying the cross-sectional profile of the cooling channels 507. Alternatively, those skilled in the art will further appreciate that configuring the effective flow area of the cooling channels 507 may involve both changing the number of cooling channels 507 and modifying the cross-sectional profile of the cooling channels 507.

Various examples have been described, each of which comprise various combinations of features. It will be appreciated by those skilled in the art that, except where clearly mutually exclusive, any of the features may be employed separately or in combination with any other features and the scope of the subject-matter disclosed extends to and includes all combinations and sub-combinations of one or more features described herein.

I claim:

1. A method of improving cooling performance of a combustor for a gas turbine engine, the method comprising the steps of:
providing the combustor comprising a liner having an inner porous wall and an outer porous wall and a plurality of porous tiles attached to the inner porous wall and the outer porous wall, wherein each porous tile comprises a base having a hot-side surface, a cold-side surface, a first circumferential extremity, a second circumferential extremity and a local radial axis;
operating the combustor to generate combustion products, wherein the plurality of porous tiles is exposed to the combustion products;
classifying regions of the plurality of porous tiles in accordance with an exposure of the regions to the combustion products, wherein regions with a higher level of exposure are classified as hot regions and regions with a lower level of exposure are classified as cool regions;
providing altered tiles by (a) delimiting the classified regions on the cold-side surfaces of the plurality of porous tiles by attaching rail structures to the cold-side surfaces and forming delimited hot regions and delimited cool regions, wherein each delimited region has a corresponding porosity; and (b) altering the porosities of the delimited regions and the porosities of the corresponding inner porous wall and outer porous wall in accordance with the classifications of the delimited regions; and installing the altered tiles and the corresponding inner porous wall and outer porous wall in the combustor.

2. The method of claim 1, wherein a porosity ratio of the porosities of the delimited hot regions relative to the porosities of the corresponding inner porous wall and outer porous wall is adjusted such that a pressure drop over the delimited hot regions is at least 10% of a combustor inlet pressure.

3. The method of claim 2, wherein the porosity ratio is reduced by increasing the porosities of the corresponding inner porous wall and outer porous wall and/or by reducing the porosities of the delimited hot regions.

4. The method of claim 1, wherein a porosity ratio of the porosities of the delimited cool regions relative to the porosities of the corresponding inner porous wall and outer porous wall is increased by reducing the porosities of the corresponding inner porous wall and outer porous wall or by reducing the porosities of the corresponding inner porous wall and outer porous wall and increasing the porosities of the delimited cool regions.

5. The method of claim 3, wherein each porous tile has a number of cooling channels, wherein each cooling channel has a cross-section, and wherein an increase in the porosity of a delimited region is realised by an increase in the number of cooling channels and/or an increase in the cross-sections of the cooling channels in the delimited region and correspondingly, a decrease in the porosity of a delimited region is realised by a decrease in the number of cooling channels and/or a decrease in the cross-sections of the cooling channels in the delimited region.

6. The method of claim 4, wherein each porous tile has a number of cooling channels, wherein each cooling channel has a cross-section, and wherein an increase in the porosity of a delimited region is realised by an increase in the number of cooling channels and/or an increase in the cross-sections of the cooling channels in the delimited region and correspondingly, a decrease in the porosity of a delimited region is realised by a decrease in the number of cooling channels and/or a decrease in the cross-sections of the cooling channels in the delimited region.

7. The method of claim 1, wherein each of the rail structures comprises one or more cambered sections arranged at an angle relative to the local radial axis.

8. The method of claim 7, wherein each of the rail structures further comprises two edge sections located around the circumferential extremities.

9. The method of claim 8, wherein at least one of the edge sections comprises at least one perforation.

10. The method of claim 8, wherein at least one of the edge sections is a cambered edge section arranged at an angle relative to the local radial axis.

11. The method of claim 7, wherein each of the rail structures further comprises at least one circumferential section.

12. The method of claim 11, wherein at least one cambered section extends into the at least one circumferential section.

13. The method of claim 8, wherein the base further comprises at least one of a locating feature and a retaining feature embedded around at least one of the circumferential extremities.

14. The method of claim 13, wherein at least two porous tiles are connected to each other through pairs of locating features and retaining features.

15. The method of claim 7, wherein the angle relative to the local radial axis is between +80 degrees and −80 degrees.

16. The method of claim 1, wherein at least one porous tile further comprises at least one stud attached to the cold-side surface, and wherein the at least one stud is configured to attach the at least one porous tile to the inner porous wall or the outer porous wall.

17. The method of claim 1, wherein the rail structures are configured to seal cavities between the cold-side surfaces of the porous tiles and the corresponding inner porous wall or outer porous wall.

* * * * *